United States Patent
Kurthakoti Chandrashekhara et al.

(10) Patent No.: US 9,611,836 B2
(45) Date of Patent: Apr. 4, 2017

(54) WIND TURBINE POWER CONVERSION SYSTEM

(71) Applicant: SIEMENS AKTIENGESELLSCHAFT, München (DE)

(72) Inventors: Divya Kurthakoti Chandrashekhara, New York, NY (US); Martin Hergt, Nuremberg (DE); Christian Schacherer, Hallerndorf (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 156 days.

(21) Appl. No.: 14/555,336

(22) Filed: Nov. 26, 2014

(65) Prior Publication Data
US 2016/0146192 A1 May 26, 2016

(51) Int. Cl.
| | |
|---|---|
| H02M 7/49 | (2007.01) |
| F03D 9/00 | (2016.01) |
| H02M 5/44 | (2006.01) |
| H02M 5/458 | (2006.01) |
| H02M 7/487 | (2007.01) |
| H02M 1/00 | (2006.01) |

(52) U.S. Cl.
CPC .............. *F03D 9/003* (2013.01); *H02M 5/44* (2013.01); *H02M 5/4585* (2013.01); *H02M 7/487* (2013.01); *H02M 2001/007* (2013.01)

(58) Field of Classification Search
CPC ......... H02M 7/483; H02M 2007/4835; H02M 7/49; F03D 7/0284; H02J 3/386; H02J 2003/388
See application file for complete search history.

(56) References Cited

U.S. PATENT DOCUMENTS

| | | | |
|---|---|---|---|
| 5,642,275 A | 6/1997 | Peng et al. | |
| 7,638,983 B2 | 12/2009 | Park et al. | |
| 2011/0130889 A1* | 6/2011 | Khajehoddin | H02J 3/383 700/298 |
| 2012/0161858 A1* | 6/2012 | Permuy | H02J 7/0014 327/536 |
| 2012/0163044 A1 | 6/2012 | Mayor Miguel et al. | |
| 2012/0267955 A1* | 10/2012 | Zhan | H02J 1/06 307/31 |

(Continued)

*Primary Examiner* — Harry Behm
(74) *Attorney, Agent, or Firm* — Slayden Grubert Beard PLLC

(57) ABSTRACT

The invention refers to a multilevel topology power converter (I) for electrical adaption of a low voltage alternating current (LVAC) of an electrical wind power generator (1) and a medium voltage (MV) transmission level for a transmission link to each other, the power converter (I) comprising for each phase:
- a switching unit (9) for adapting the low voltage (LV) and the medium voltage (MV) to each other, the switching unit (9) being controlled by a controller (15), whereby the controlled switching unit (9) separately switches n+1 terminal potentials along terminals of an electrical series of n>1 capacitors C1 ... Cn (7);
- a current converter (5) for providing or using a direct current (DC) through the plurality of n>1 capacitors C1 ... Cn (7) connected in series.

18 Claims, 2 Drawing Sheets

(56) References Cited

U.S. PATENT DOCUMENTS

Figure 1:
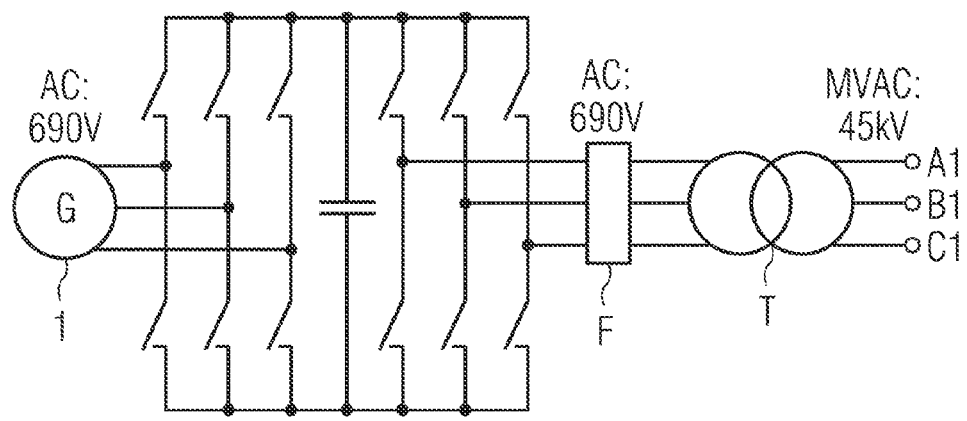

| | | | |
|---|---|---|---|
| 2013/0162043 A1* | 6/2013 | Ellena | H02J 3/38 |
| | | | 307/43 |
| 2013/0221678 A1 | 8/2013 | Zhang et al. | |
| 2013/0249322 A1 | 9/2013 | Zhang et al. | |
| 2015/0049524 A1* | 2/2015 | Wagoner | H02M 7/483 |
| | | | 363/37 |

* cited by examiner

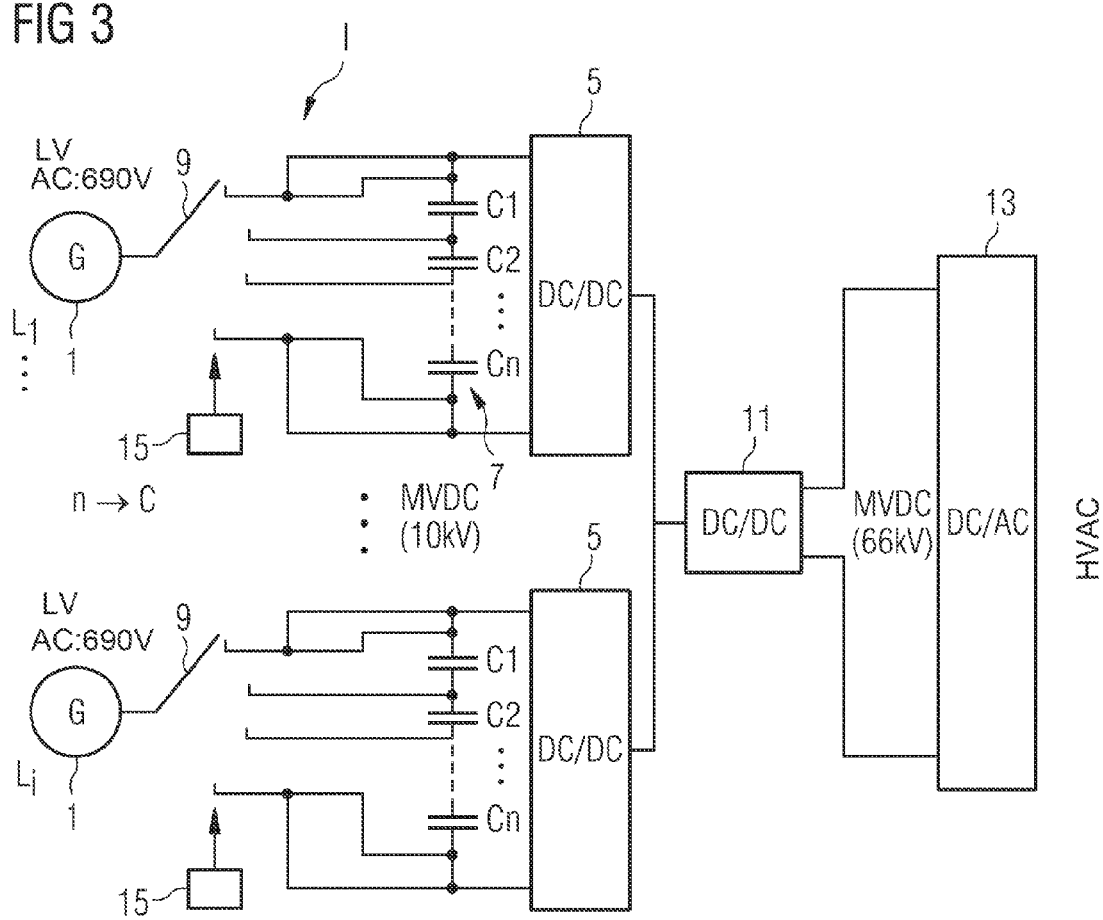
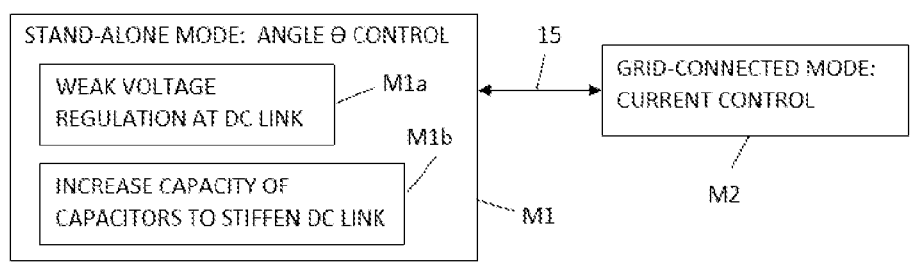

WIND TURBINE POWER CONVERSION SYSTEM

This application refers to a wind turbine frequency converter with a multilevel topology which allows black start.

Present day trend is to increase the wind turbine capacity and have larger turbines that have higher power capacities. However, irrespective of the wind turbine capacity, all these turbines generate power at low voltage, e.g. 575V/690V. This effectively means that large magnitudes of current, e.g. kilo Amps, have to be transferred, which leads to prohibitively large power losses. The current solution used to address this problem is to use AC transformers to step-up the voltage to medium voltage, e.g. 10s of kV, and thereby reduce the current magnitude.

Most of the current wind turbines use a power conversion system to convert the variable frequency output from the generator of the wind turbine to almost constant grid voltage and frequency. Additionally, most of the power conversion systems used in the wind turbines is designed to follow the grid voltage and frequency signal.

Applicant's wind converters today use a pad mount transformer to connect to the MV grid.

US 2013/0221678 A1 discloses a multilevel converter with at least one phase each including several cascaded base units each including a first switching element, a second switching element, and a separate and electrically isolated DC source. Cascaded elements are used to achieve voltage scaling. The cascaded H-bridge topology however requires isolated DC source and supply.

US 2013/0249322 A1 discloses a multilevel converter which includes at least one phase, whereby each phase of the multilevel converter includes a direct current link, a first circuit, a second circuit, and a phase capacitor. The DC link is electrically coupled to the DC-DC converter of the wind power generation system.

US 2012/0163044 A1 discloses a multilevel voltage arrangement having a transformer and a power converter or inverter comprising one or more common DC links connectable to a power source, said arrangement comprising one first set of H-bridges being connected to said common DC link. This topology comprises an open winding generator to achieve medium voltage. This topology also requires isolated DC source.

U.S. Pat. No. 7,638,983 B2 discloses a controller of a grid coupled type doubly-fed induction generator having a multi-level converter topology, which can control the doubly-fed induction generator having a high voltage specification and can perform a fault ride-through function, an anti-islanding function and a grid voltage synchronization function required for a dispersed power generation facility. A H-bridge multilevel for a DFIG wind turbine type is proposed. A boost converter composed of a 3-leg IGBT and a boost inductor is used to generate a direct current voltage source required for the H-bridge multilevel converter.

U.S. Pat. No. 5,642,275 discloses a multilevel cascade voltage source inverter having separate DC sources, whereby this inverter is applicable to high voltage, high power applications such as flexible AC transmission systems including static VAR generation, power line conditioning, series compensation, phase shifting and voltage balancing and fuel cell and photovoltaic utility interface systems. A cascaded H-bridge topology is proposed for full converter.

Wind turbines usually generate power at low voltage at large magnitudes of current to be transferred, which leads to prohibitively large power losses. Conventionally to address this problem AC (alternating current) transformers to step-up the low voltage to medium voltage, e.g. at around 46 KV, are used to reduce the current magnitude. Conventional power conversion systems use semiconductor devices, e.g. IGBTs (insulated gate bipolar transistors), which can be operated merely at low voltage but not at medium voltage.

Additionally, most of the power conversion systems used in the wind turbines is designed to follow the grid voltage and frequency signal.

It is an object of the invention to provide a power conversion system for converting a variable frequency output of a wind turbine generator, to a constant grid voltage and frequency. For example generated power at low voltage, e.g. at around 575V to 690V, and large magnitudes of current, e.g. KAs, should be converted to a constant grid voltage and frequency. Large power losses resulting from large magnitudes of current must be avoided. Moreover a black start of the wind power station should be possible. Conventional wind converters which use a pad mount transformer to connect to the medium voltage grid should be replaced.

The object of the present invention is solved by a multilevel topology power converter according to the features of the main claim and a method for controlling a multilevel topology power converter according to the auxiliary claim.

According to a first aspect a multilevel topology power converter for electrical adaption of a low voltage alternating current of an electrical wind power generator and a medium voltage transmission level for a transmission link to each other is proposed, whereby the power converter comprises for each phase a switching unit for adapting the low voltage and the medium voltage to each other, the switching unit being controlled by a controller.

According to a second aspect of the present invention a method for controlling a multilevel topology power converter is suggested, whereby the controller of the converter controls in a dual mode operating by load angle control in a stand-alone mode and by current control in a grid-connected mode of the electrical wind power generator.

A generic frame work for multilevel types of converter topology is proposed, which not only eliminates the bulky transformer but also provides smoother AC voltage wave form and less susceptible to dv/dt stresses. The proposed topology in addition to the capability of operating in stand-alone mode is unique. Also, we suggest how our method could be used to develop a MVDC grid solution for medium capacity wind farms, for which today's HVDC solutions are prohibitively expensive and AC solutions may not be feasible, e.g. at offshore wind farms.

Advantageously this topology can potentially reduce the weight and the footprint of wind electrical conversion systems by reducing filter size and by eliminating conventional AC transformer. Also the prices of semiconductor devices are decreasing, so replacing copper/iron, especially within transformers, by solid-state devices could potentially lead to lower cost. Also, in future, this approach can benefit substantially from the enormous improvements in semiconductor device technology like, increased liability, smaller footprint, higher efficiency, increased power rating and so on. Also, the proposed converter control allows the wind turbines to black start and even for an AC grid when needed. The converter can operate in both grid connected and stand-alone mode. These features are not available in conventional wind turbine systems.

The inventive power conversion system uses semiconductor devices, e.g. IGBTs, that can be operated at low voltages and also medium voltages.

It was discovered that a multilevel topology power converter for electrical adaption of a low voltage alternating current (LVAC) of a near electrical wind power generator can be used to provide a medium voltage (MV) transmission level close at the generator, whereby a longer transmission link from the converter towards a HVAC station or a HVDC station can be provided and power losses resulting from too high current can be avoided. This adaption is performed without a transformer but with a controlled switching unit. Basically the inventive converter can operate into two directions, which is for generating electrical power from the generator or which is for synchronizing the generator to the grid.

A black start in particular is the process of restoring a power station to operation without relying on the external electric power transmission network. According to this application the wording "without external electric power transmission network" means being in the mode of stand-alone and not in the mode of grid-connected.

A pad mount transformer in particular is a ground mounted electric power distribution transformer in a locked steel cabinet mounted on a concrete pad. According to this application this transformer should become obsolete.

AC is alternating current. DC is direct current. LV means low voltage. MV means medium voltage. HV means high voltage. The ranges for the voltage levels are well known in the state of the art.

Load angle is the angle with which a magnet wheel of a synchronous machine runs at a higher or lower speed than a synchronous rotating field.

Further embodiments are discussed by the following subclaims.

According to an advantageous embodiment the multilevel topology power converter can comprise for each phase a current converter for providing a direct current; a plurality of $n>1$ capacitors $C1 \ldots Cn$ electrically connected in series; the control switching unit for separately switching n+1 terminal potentials along terminals of the series of the $n>1$ capacitors $C1 \ldots Cn$. "n" is an element of the natural numbers.

According to a further embodiment the multilevel topology power converter can comprise for each phase the current converter for providing by two terminals a low voltage direct current from the low voltage alternating current of the electrical power generator; the plurality of $n>1$ capacitors $C1 \ldots Cn$ electrically connected in series between the two terminals of the low voltage direct current; the control switching unit for separately switching n+1 terminal potentials along terminals of the series of the $n>1$ capacitors $C1 \ldots Cn$ to provide a medium voltage alternating current for the transmission link.

According to a further advantageous embodiment the multilevel topology power converter can comprise for each phase the electrical power generator generating the low voltage alternating current; the control switching unit for separately switching n+1 terminal potentials from the electrical generator along terminals of a series of $n>1$ capacitors $C1 \ldots Cn$ electrically connected in series between two main terminals to provide a first medium voltage direct current by the two main terminals; the current converter for adapting the first medium voltage direct current into a second medium voltage direct current for the transmission link.

According to a further advantageous embodiment the multilevel topology power converter with the controlled switching unit comprises semiconductor devices, in particular present day IGBT-devices, that can enable connection to MVAC voltages of 10 kV or higher. IGBT is Insulated Gate Bipolar Transistor.

According to a further advantageous embodiment a plurality of electrical power generator assembly levels can be electrical connected in parallel to each other and their current converters can adapt their second medium voltage direct currents to each other.

According to a further advantageous embodiment the plurality of the electrical power generator assembly levels can be electrically connected in parallel to a common current converter which increases the voltage of the second medium voltage direct current to a higher voltage of the second medium voltage direct current for the transmission link.

According to a further advantageous embodiment a DC/AC converter changes the higher voltage of the second medium voltage direct current into a high voltage alternating current.

According to a further advantageous embodiment an AC/AC converter changes the medium voltage alternating current into a high voltage alternating current.

According to a further advantageous embodiment the controller of the converter can control in a dual mode operating by load angle control in a stand-alone mode and by current control in a grid-connected mode of the electrical wind power generator.

According to a further advantageous embodiment the controller of the converter can switch from the standard current control of the grid-connected mode to the load angle control of the stand-alone mode of the electrical wind power generator and vice versa.

According to a further advantageous embodiment the controller of the converter can generate an own reference signal while operating in the stand-alone mode.

According to a further advantageous embodiment in the stand-alone mode the controller of the converter can control the active power output of the converter by the load angle control, if the converter regulates to a constant output voltage of the converter.

According to a further advantageous embodiment in the stand-alone mode the controller of the converter can regulate to the constant output voltage thus the active power output of the converter is proportional to the load angle.

According to a further advantageous embodiment for the stand-alone mode within the converter the capacities of the capacitors $C1 \ldots Cn$ can be increased to provide a stiffer series of the capacitors $C1 \ldots Cn$.

According to a further advantageous embodiment for the stand-alone mode the converter can comprise a weak voltage regulation of the voltages at the capacitors $C1 \ldots Cn$.

Figure 2:
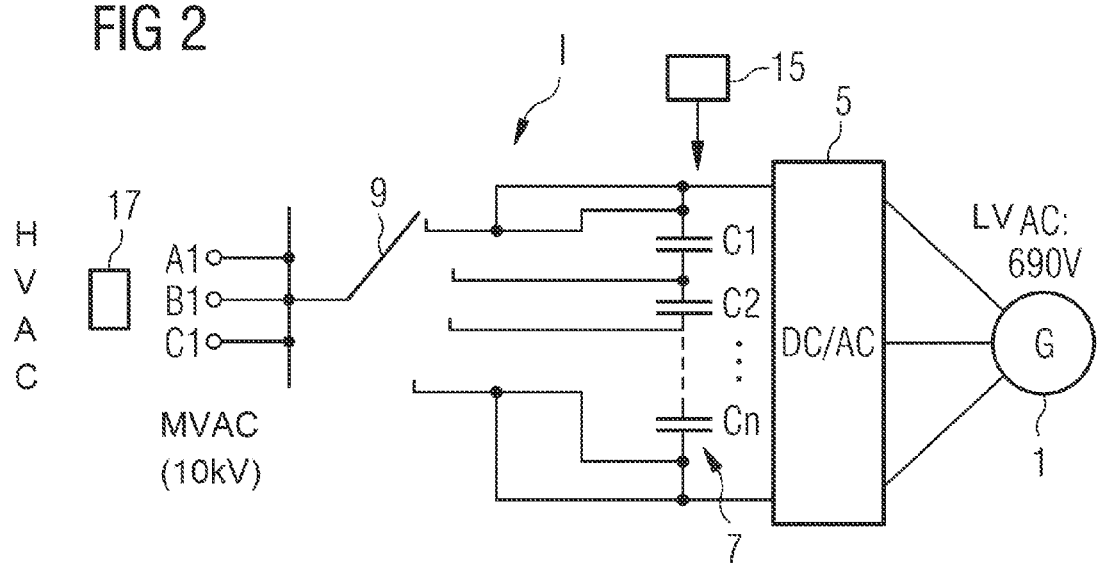

The invention will be closer discussed by embodiments in relation to the drawings. It shows:

FIG. 1 an embodiment of a conventional converter;
FIG. 2 a first embodiment of an inventive converter;
FIG. 3 a second embodiment of an inventive converter;
FIG. 4 an embodiment of an inventive method.

FIG. 1 shows an embodiment of a conventional converter. Most of the conventional commercial wind converters use two level back-to-back converters, shown in FIG. 1. The conventional two-level inverters are mostly used to generate an AC voltage from a DC voltage. The two-level DC inverter can only create two different output voltages e.g. Vdc/2 or −Vdc/2, when the DC link voltage is regulated at Vdc. To build up an AC output voltage these two voltages are usually switched with PWM, which is Pulse Width Modulation. Although the two level converter has the highest reliability due to fewer semiconductor switches, it is well known that the output voltage has unacceptably high harmonic distortions, EMI, which is electromagnetic interference and high dv/dt. In order to overcome these limitations, the conventional wind turbine power converters, quite often have large filters F concerning harmonics along with snubber circuits concerning dv/dt.

FIG. 2 shows a first embodiment of an inventive converter I. The limitations of a conventional 2-level converter can be overcome by using either multilevel or what is referred to as a "multi-cell" converter topology. The above stated conventional multi-cell converters connect different converter topologies (cells) in cascade. The most commonly used multi-cell topology is the cascaded H-bridge topology. Some of the main disadvantages of multi-cell topologies are that quite often they require isolated DC source and voltage balancing, modulation and control can be quite complex. The multi-level topology on the other band does not require isolated DC voltage source but must require the generator to be insulated for the full/rated voltage and this is often the case for the AC generators used in wind turbines.

FIG. 2 shows a generalized "n" level inverter that generates voltage steps of magnitude Vdc/(n−1). The switches in this converter I can be controlled so that the DC voltage can be inverted into AC voltage with 2n steps instead of 2 steps like at the 2 level converter according to FIG. 1. With more voltage levels in the inverter the AC waveform is smoother with fewer distortions and closer to the desired frequency and voltage magnitude. The number of switches used in the topology according to FIG. 2 depends on the desired number of voltage steps and the filtering requirements. The other advantage of this topology is that with the existing IGBT devices 10 kV or higher line-line voltages can be generated. Thereby the need for bulky and in-efficient 690V/575V and 50/60 Hz pad-mount AC transformers T used in wind turbine systems according to FIG. 1 can be eliminated.

FIG. 2 shows the inventive multilevel topology power converter I whereby the three phases A1, B1 and C1 are shown. For each phase A1, B1 and C1 the converter I comprises a current converter 5 for providing by two terminals a low voltage direct current LVDC from the low voltage alternating current LVAC of the electrical power generator I; a plurality of n>1 capacitors C1 . . . Cn 7 electrically connected in series between the two terminals of the low voltage direct current LVDC; and a controlled switching unit 9 for separately switching n+1 terminal potentials along terminals of the series of the n>1 capacitors C1 . . . Cn 7 to provide a medium voltage alternating current MVAC for a transmission link in particular two e.g. a high voltage alternating current HVAC station 17. The voltage level of the generator 1 is AC at 690V and the transmission link level can be e.g. MVAC at 10 kV.

FIG. 3 shows a second embodiment of an inventive multilevel topology power converter I. The proposed topology according to FIG. 2 can also be used to generate a medium voltage DC transmission link for smaller wind farms. This solution probably is a more cost effective DC solution for smaller capacity wind farms than the HVDC solution and also has all the advantages like the voltage source converter based HVDC solutions, e.g. HVDC PLUS or HVDC LIGHT. In case where AC solutions are technically infeasible we could the proposed MVDC transmission link for wind farms as shown in FIG. 3.

According to this embodiment the converter I comprises for each phase an electrical power generator I generating the low voltage alternating current LVAC; a control switching unit 9 for separately switching n+1 terminal potentials from the electrical generator 1 along terminals of a series of n>1 capacitors C1 . . . Cn 7 electrically connected in series between two main terminals that provide a first medium voltage direct current MVDC by the two main terminals; a current converter 5 for adapting the first medium voltage direct current MVDC into a second medium voltage direct current MVDC for the transmission link. The first and the second medium voltage direct current can be on the level of 10 kV. The control switching unit 9 comprises semiconductor devices, in particular IGBTs which can be used for up to AC line voltages of 10 kV. FIG. 3 shows a plurality of electrical power generators 1 providing assembly levels L1 . . . Li which are electrically connected in parallel to each other, whereby the current converters 5 adapt their second medium voltage direct currents MVDC to each other. The assembly levels L1 . . . Li can also be electrically connected in parallel to a common current converter 11 which increases the voltage of the second medium voltage direct current from 10 kV to a higher voltage of the second medium voltage direct current of 66 kV for further transmission. For example, a DC/AC converter 13 changes the higher voltage of the second medium voltage direct current MVDC into a high voltage alternating current HVAC. At this stage a grid level is reached.

If the number n of levels or switches is reduced a switching at higher frequency without substantially compromising any of the benefits can be performed. The advantages which remain can be lower harmonics and lower electromagnetic impact EMI. This would require an adapted device technology like the wide band gap devices (for example on silicon-carbide basis). However, the wideband gap device technology has to be found to withstand high voltages so generate medium voltage on the AC side, which especially can be more than 15 kV.

FIG. 4 shows two modes M1 and M2 the inventive multilevel topology power converter I operates in. In the first mode M1 the controller 15 of the converter I controls by controlling a load angle Θ of the generator I. In the second mode M2 the controller 15 of the converter I controls the current being provided at the grid side. Accordingly a dual mode for the converter controller 15 is suggested. The controller 15 switches from angle Θ control to current control, when the wind turbine mode of operation changes from stand-alone to grid-connected mode. The outer power control and inner current control, is the de-facto controls used in most wind converters today. The converter control loops are designed assuming that the grid reference signal exists. However, in a stand-alone mode this is not the case. So, a converter control is proposed, that generates its own reference signal while operating in a stand-alone mode. Also is suggested to switch from the standard current controls, to angle control when the wind turbine is operating in the stand-alone mode.

For the stand-alone mode it is proposed to use angle Θ control that is based on the following logic. Basing on formular 1:

$$P = V \cdot V_{PCC} \cdot \sin \Theta / Z_{th} \quad (1)$$

whereby

P is the active power of the converter I output.

V is the generator voltage.

$V_{PCC}$ is the output voltage of the converter I.

angle Θ is the load angle of the generator 1. Zth is the Thevinin impedance, whereby resistances are neglected. Thevinin impedance is the equivalent impedance obtained at terminals A-B of any linear electric network with all its independent current sources open circuited and all its independent voltage sources short circuited.

If $V_{PCC}$ is held constant the active power output P is proportional to the load angle Θ.

If the converter regulates voltage instead of reactive power then, the active power output p of the wind converter can be controlled by controlling the load angle Θ instead of current.

However, in practice there is a need for stiffer DC link, which could be provided by the multilevel topology. The DC link is the arrangement of the capacities $C1 \ldots Cn$ connected in series. This need is because in any operating mode, the power must be balanced, which means mechanical power output of the turbine should be equal to the electrical power output if losses are neglected. Since angle Θ control is slow, the input power to the converter I which is the output power from the electrical generator I is not equal to the converter I output power. This delay in power transfer causes the DC current through the DC link to be non-zero and this can be overcome either by performing a weak voltage regulation at the DC link, as indicated in FIG. 4 at M1a, or by making the DC link stiff by increasing the capacitances of the series of capacitors $C1 \ldots Cn$, as indicated in Fig. 4 at M1b. It is suggested that the multilevel topology with a stiff DC link is a better choice as it provides better stability.

The invention refers to a multilevel topology power converter I for electrical adaption of a low voltage alternating current LVAC of an electrical wind power generator 1 and a medium voltage MV transmission level for a transmission link to each other, the power converter I comprising for each phase:
 a switching unit 9 for adapting the low voltage LV and the medium voltage MV to each other, the switching unit 9 being controlled by a controller 15. For each phase a current converter 5 provides a direct current DC towards or from a plurality of $n>1$ capacitors $C1 \ldots Cn$ 7 electrically connected in series, whereby the controlled switching unit 9 switches n+1 terminal potentials along terminals of the series of the $n>1$ capacitors $C1 \ldots Cn$ 7 which can be called "DC link".

The invention refers to a multilevel topology power converter I for electrical adaption of a low voltage alternating current LVAC of an electrical wind power generator 1 to a medium voltage MV transmission level for a transmission link, the power converter I comprising for each phase:
 a switching unit 9 for adapting the low voltage LV to the medium voltage MV, the switching unit 9 being controlled by a controller 15, whereby the controlled switching unit 9 separately switches n+1 terminal potentials along terminals of an electrical series of $n>1$ capacitors $C1 \ldots Cn$ 7;
 a current converter 5 for providing or using a direct current DC through the plurality of $n>1$ capacitors $C1 \ldots Cn$ 7 connected in series, which is a DC link.

The invention claimed is:

1. Multilevel topology power converter for electrical adaption of a low voltage alternating current of an electrical wind power generator and a medium voltage transmission level for a transmission link to each other, the power converter comprising for each phase:
 a switching unit for adapting the low voltage and the medium voltage to each other;
 a current converter for providing a direct current towards or from a plurality of $n>1$ capacitors $C1 \ldots Cn$ electrically connected in series; and
 a control system configured to:
  control the switching unit to switch the n+1 terminal potentials along terminals of the series of the $n>1$ capacitors $C1 \ldots Cn$, to thereby provide a DC to AC inverter; and
  provide a dual mode operation of the converter based on a status of the electrical wind power generator, by dynamically switching between:
   a grid-connected control mode during a grid-connected mode of the electrical wind power generator, wherein the control system controls a grid-side current; and
   a stand-alone control mode in a stand-alone status of the converter electrical wind power generator, wherein the control system:
    increases capacitances of the capacitors $C1 \ldots Cn$ to increase a stiffness of the series of the capacitors $C1 \ldots Cn$; and
    actively controls a load angle.

2. Multilevel topology power converter according to claim 1, comprising for each phase: the current converter for providing at two main terminals a low voltage direct current from or to the low voltage alternating current of the electrical power generator; the plurality of $n>1$ capacitors $C1 \ldots Cn$ electrically connected in series between the two main terminals of the low voltage direct current; the controlled switching unit for separately switching n+1 terminal potentials along terminals of the series of the $n>1$ capacitors $C1 \ldots Cn$ to provide a medium voltage alternating current for or from the transmission link.

3. Multilevel topology power converter according to claim 2, characterized in that an AC/AC converter adapts the medium voltage alternating current with a high voltage alternating current.

4. Multilevel topology power converter according to claim 1, comprising for each phase: the electrical power generator generating or adjusting to the low voltage alternating current; the controlled switching unit for separately switching n+1 terminal potentials from or to the electrical generator along terminals of the series of $n>1$ capacitors $C1 \ldots Cn$ electrically connected in series between two main terminals to provide a first medium voltage direct current at the two main terminals; the current converter for adapting the first medium voltage direct current and a second medium voltage direct current for the transmission link to each other.

5. Multilevel topology power converter according to claim 4, wherein a plurality of electrical power generator assembly levels is electrically connected in parallel to each other and their current converters adapt their second medium voltage direct currents to each other.

6. Multilevel topology power converter according to claim 5, wherein the plurality of electrical power generator assembly levels is electrically connected in parallel to a common current converter which adapts the voltage of the second medium voltage direct current with a higher voltage of the second medium voltage direct current for the transmission link.

7. Multilevel topology power converter according to claim 6, wherein a DC/AC converter adapts the higher voltage of the second medium voltage direct current with a high voltage alternating current.

8. Multilevel topology power converter claim 1, wherein the controlled switching unit comprises insulated-gate bipolar transistor (IGBT) devices configured to operate at AC line voltages of 10 kV or higher.

9. Multilevel topology power converter according to claim 1, wherein the control system of the converter switches from the standard current control of the grid-connected mode to the load angle control of the stand-alone mode of the electrical wind power generator and vice versa.

10. Multilevel topology power converter according to claim 1, wherein the control system of the converter generates an own reference signal while operating in the stand-alone mode.

11. Multilevel topology power converter according to claim 1, wherein in the stand-alone mode the control system of the converter controls the active power output of the converter by the load angle control, if the converter regulates to a constant output voltage of the converter.

12. Multilevel topology power converter according to claim 11, wherein in the stand-alone mode the control system of the converter regulates to the constant output voltage thus the active power output of the converter is proportional to the load angle.

13. Multilevel topology power converter according to claim 1, wherein for the stand-alone mode the converter comprises a voltage regulation of the voltages at the capacitors C1 . . . Cn.

14. Method for controlling a multilevel topology power converter for electrical adaption of a low voltage alternating current of an electrical wind power generator and a medium voltage transmission level for a transmission link to each other, the power converter comprising for each phase: a switching unit for adapting the low voltage and the medium voltage to each other, the switching unit being controlled by a control system, and a current converter for providing a direct current towards or from a plurality of n>1 capacitors C1 . . . Cn electrically connected in series, the method comprising:
  controlling, by the control system, the switching unit to switch the n+1 terminal potentials along terminals of the series of the n>1 capacitors C1 . . . Cn, to thereby provide a DC to AC inverter, and
  provide a dual mode operation of the convertor based on a status of the electrical wind power generator, by dynamically switching between:
    a grid-connected control mode during a grid-connected mode of the electrical wind power generator, wherein the control system controls a grid-side current; and
    a stand-alone control mode in a stand-alone status of the converter electrical wind power generator, wherein the control system:
      increases capacitances of the capacitors C1 . . . Cn to increase a stiffness of the series of the capacitors C1 . . . Cn; and
      provides load angle control.

15. Method for controlling a multilevel topology power converter according to claim 14, wherein the control system of the converter generates an own reference signal while operating in the stand-alone control mode.

16. Method for controlling a multilevel topology power converter according to claim 14, wherein in the stand-alone control mode the control system of the converter controls an active power output of the converter by the load angle control, if the converter regulates to a constant output voltage of the converter.

17. Method for controlling a multilevel topology power converter according to claim 16, wherein in the stand-alone control mode the control system of the converter regulates to a constant output voltage such that the active power output of the converter is proportional to the load angle.

18. Method for controlling a multilevel topology power converter according to claim 14, wherein for the stand-alone control mode the converter regulates the voltages at the capacitors C1 . . . Cn.

* * * * *